United States Patent
Choi et al.

(10) Patent No.: US 9,832,711 B2
(45) Date of Patent: Nov. 28, 2017

(54) METHOD OF TRANSMITTING AND RECEIVING CELL INFORMATION BY USING SYNCHRONIZATION SIGNAL AND DEVICE SUPPORTING SAME

(71) Applicant: LG ELECTRONICS INC., Seoul (KR)

(72) Inventors: Hyeyoung Choi, Seoul (KR); Heejeong Cho, Seoul (KR); Jaehoon Chung, Seoul (KR); Genebeck Hahn, Seoul (KR); Eunjong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/909,005

(22) PCT Filed: Aug. 13, 2014

(86) PCT No.: PCT/KR2014/007527
§ 371 (c)(1),
(2) Date: Jan. 29, 2016

(87) PCT Pub. No.: WO2015/026098
PCT Pub. Date: Feb. 26, 2015

(65) Prior Publication Data
US 2016/0165521 A1 Jun. 9, 2016

Related U.S. Application Data

(60) Provisional application No. 61/868,103, filed on Aug. 21, 2013.

(51) Int. Cl.
*H04W 4/00* (2009.01)
*H04W 48/10* (2009.01)
*H04W 48/16* (2009.01)

(52) U.S. Cl.
CPC ............ *H04W 48/10* (2013.01); *H04W 48/16* (2013.01)

(58) Field of Classification Search
None
See application file for complete search history.

(56) References Cited

U.S. PATENT DOCUMENTS

2010/0202476 A1* 8/2010 Chun .................... H04W 28/06
370/477
2010/0297955 A1* 11/2010 Marinier .......... H04W 36/0061
455/73

(Continued)

FOREIGN PATENT DOCUMENTS

CN   102781042 A   * 11/2012
JP   2012-182522       9/2012

(Continued)

OTHER PUBLICATIONS

Machine Translation of CN 102781042 A.*

(Continued)

*Primary Examiner* — German J Viana Di Prisco
(74) *Attorney, Agent, or Firm* — Lee Hong Degerman Kang Waimey

(57) ABSTRACT

The present invention relates to a wireless access system, and provides a method of transmitting and receiving cell information by using a synchronization signal in a small-cell layout environment and a device supporting the same. A method of transmitting cell information in a wireless access system as an embodiment of the present invention may include the steps of: configuring one or more pieces of cell information by means of a base station; configuring a downlink synchronization signal including one or more pieces of cell information by means of the base station; and broadcasting the downlink synchronization signal by means of the base station. In this case, the cell information is (Continued)

(a)

(b)

configured to be information different from the downlink synchronization information configured based on the downlink synchronization signal.

15 Claims, 10 Drawing Sheets

(56) References Cited

U.S. PATENT DOCUMENTS

| | | | | |
|---|---|---|---|---|
| 2016/0057185 A1* | 2/2016 | Zhang | .................. | H04W 4/027 |
| | | | | 709/231 |
| 2016/0066255 A1* | 3/2016 | Marinier | ............... | H04W 48/16 |
| | | | | 370/350 |
| 2016/0278021 A1* | 9/2016 | Takeda | .................. | H04W 16/32 |

FOREIGN PATENT DOCUMENTS

| | | |
|---|---|---|
| KR | 10-2012-0008431 | 1/2012 |
| KR | 10-2012-0009913 | 2/2012 |
| WO | 2010/073468 | 7/2010 |

OTHER PUBLICATIONS

PCT International Application No. PCT/KR2014/007527, Written Opinion of the International Searching Authority dated Nov. 24, 2014, 17 pages.

* cited by examiner

-- Prior Art--

-- Prior Art--

-- Prior Art--

-- Prior Art--

-- Prior Art --

MeNB : Macro eNB   MUE : Macro UE
PeNB : Pico eNB    PUE : Pico UE
FeNB : Femto eNB   FUE : Femto UE -- Prior Art --

-- Prior Art --

-- Prior Art --

(a)

(b)

(a)

(b)

METHOD OF TRANSMITTING AND RECEIVING CELL INFORMATION BY USING SYNCHRONIZATION SIGNAL AND DEVICE SUPPORTING SAME

CROSS-REFERENCE TO RELATED APPLICATIONS

This application is the National Stage filing under 35 U.S.C. 371 of International Application No. PCT/KR2014/007527, filed on Aug. 13, 2014, which claims the benefit of U.S. Provisional Application No. 61/868,103, filed on Aug. 21, 2013, the contents of which are all hereby incorporated by reference herein in their entirety.

TECHNICAL FIELD

The present invention relates to a wireless access system, and more particularly, to a method of transmitting and receiving cell information in a small cell deployment environment by using a synchronization signal and apparatus for supporting the same.

BACKGROUND ART

Wireless communication systems have been widely deployed to provide various types of communication services such as voice or data services. Generally, a wireless communication system is a multiple access system capable of supporting communication with multiple users by sharing available system resources (bandwidth, transmit power, etc.). Multiple access systems include, for example, a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, etc.

A radio access network (RAN) configuration has been changed such that various types of small cells such as a pico cell, a femto cell, etc. interact with a macro cell. The RAN configuration refers to a heterogeneous cell configuration or a hierarchical cell configuration in which small cells for low power/near field communication coexist in addition to an existing macro cell-based homogeneous network. The heterogeneous cell structure is used to enhance quality of experience (QoE) by providing a high data transmission rate to a last user.

In small cell enhancements for E-UTRA and E-UTRAN study item (SI) as one of 3rd generation partnership project (3GPP) standard scopes, research has been ongoing into enhancement of indoor/outdoor scenarios using low power nodes, and the scenarios is described in 3GPP TR 36.932.

Considering such a trend, as a large number of small cells will be deployed within a macro cell, final UEs (user equipments) may be physically located closer to a network. Accordingly, it is expected that communication will be performed through a UE-centered zone in a next generation radio access network, instead of the conventional physical cell-based communication. To realize communication through UE-centered zones with the aim of increasing throughput, technical issues for implementing a service-providing unit such as the UE-centered zone different from the current service-providing unit such as the physical cell should be drawn and handled.

In addition, the introduction of the small cell may significantly affect a current remote area network (RAN). Particularly, in case that a number of small cells are installed within a macro cell area, it may cause a problem that a UE matches synchronization with a small cell not associated with the corresponding UE or performs a procedure for accessing the non-associated small cell.

DISCLOSURE OF THE INVENTION

Technical Problem

One object of the present invention is to provide a method of transmitting and receiving a cell information efficiently.

Another object of the present invention is to provide a method of transmitting a cell information through a synchronization signal.

A further object of the present invention is to provide an apparatus for supporting the above-mentioned methods.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

The present invention relates to a wireless access system, and more particularly, to a method of transmitting and receiving cell information in a small cell deployment environment by using a synchronization signal and apparatus for supporting the same.

In a $1^{st}$ technical aspect of the present invention, provided herein is a method of transmitting a cell information in a wireless access system, including a step for an eNodeB (eNB) to configure at least one cell information, a step for the eNB to configure a downlink synchronization signal including the at least one cell information, and a step for the eNB to broadcast the downlink synchronization signal. In this case, the cell information may be configured different from a downlink synchronization information configured based on the downlink synchronization signal.

In a $2^{nd}$ technical aspect of the present invention, provided herein is an eNodeB (eNB) configured to transmit a cell information in a wireless access system, including a transmitter and a processor for supporting configuration and transmission of the cell information. In this case, the processor may be configured to configure at least one cell information, to configure a downlink synchronization signal including the at least one cell information, and to control the transmitter to broadcast the downlink synchronization signal. In this case, the cell information may be configured different from a downlink synchronization information configured based on the downlink synchronization signal.

In a $3^{rd}$ technical aspect of the present invention, provided herein is a method of receiving a cell information by a user equipment (UE) in a wireless access system, including steps of receiving a downlink synchronization signal from an eNodeB (eNB), detecting at least one cell information from the downlink synchronization signal, and determining whether to continuously perform an initial access procedure with respect to the eNB based on the at least one cell information. In this case, the cell information may be configured different from a downlink synchronization information configured based on the downlink synchronization signal.

In a $4^{th}$ technical aspect of the present invention, provided herein is a user equipment (UE) configured to receive a cell information in a wireless access system, including a receiver and a processor for detecting the cell information. In this case, the processor may be configured to control the receiver to receive a downlink synchronization signal from an eNodeB (eNB), to detect at least one cell information from the downlink synchronization signal, and to determine whether to continuously perform an initial access procedure with respect to the eNB based on the at least one cell information and the cell information may be different from a downlink synchronization information configured based on the downlink synchronization signal.

The cell information may include at least one selected from the group consisting of an ETWS (Earthquake and Tsunami Warning System) indicator, a CMAS (Commercial Mobile Alert System) indicator, a HeNB (Home enhanced Node-B) information, a cell state and cell reservation related information, a cell load information, a transmission power information, a C-RAN (Cloud Radio Access Network) indicator, a BBU ID (Base Band Unit Identifier) information, and a layer level information.

The downlink synchronization information may include either a physical cell identifier of the eNB or an RRH (Remote Radio Head) identifier.

The downlink synchronization signal may further include a cell information indicator for indicating which cell information among the at least one cell information is included in the downlink synchronization signal.

The above-mentioned technical aspects of the present invention are only some of the preferred embodiments of the present invention and various embodiments of the present invention, to which the technical features of the present invention are applied, are understood by those skilled in the art from the detailed description of the present invention.

Advantageous Effects

According to the embodiments of the present invention, the following advantages may be obtained.

First of all, a cell information can be efficiently transmitted and received.

Secondly, by transmitting and receiving a cell information through a synchronization signal, a small cell on which an initial access procedure is performed can be efficiently detected in an environment having a number of small cells deployed therein. In particular, the initial access procedure does not need to be performed on all the small cells.

It will be appreciated by persons skilled in the art that the effects that can be achieved with the present invention are not limited to what has been particularly described hereinabove and other advantages of the present invention will be more clearly understood from the following detailed description. In other words, advantages or effects not intended by the present invention may be derived from the embodiments of the present invention by those with ordinary skill in the art.

DESCRIPTION OF DRAWINGS

The accompanying drawings, which are included to provide a further understanding of the invention, illustrate embodiments of the invention and together with the description serve to explain the principle of the invention. However, technical features of the present invention are not limited to the accompanying drawings and features disclosed in the respective drawings may be combined to constitute new embodiments.

BEST MODE FOR INVENTION

Figure 1:
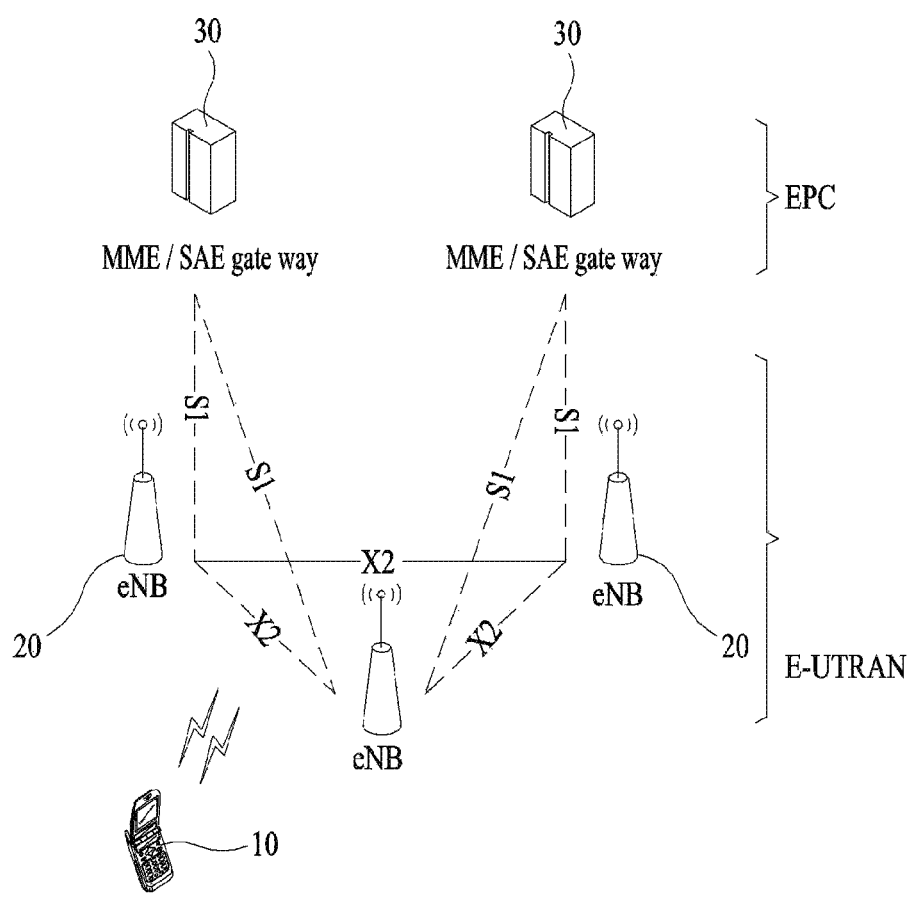
FIG. 1 is a block diagram for a network structure of E-UMTS.

The embodiments of the present inventions provide methods of transceiving a cell information using a synchronization signal in a small cell-based network system and apparatuses for supporting the same.

The following embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be substituted with corresponding structural elements or features of another embodiment.

In the description of drawings, processes or steps that may make the subject matter of the present invention obscure will not be disclosed. Also, processes or steps that may be understood by the person with ordinary skill in the art will not be disclosed.

Throughout the specification, when some part 'comprises' or 'includes' some elements, unless explicitly described to the contrary, it means that other elements may be further included but not excluded. The terms '-unit', '-or(er)', and 'module' described in the specification mean units for processing at least one function or operation, which can be implemented by hardware or software and any combination thereof. In addition, as used in the specification (particularly, in the appended claim), the singular forms 'a', 'an', 'one', and 'the' are intended to include the plural forms as well unless the context clearly dictates otherwise or it is explicitly stated otherwise.

In this specification, the embodiments of the present invention have been described based on the data transmission and reception relation between a base station and a mobile station. In this case, the base station means a terminal node of a network, which performs direct communication with a terminal. A specific operation which has been described as being performed by the base station may be performed by an upper node of the base station as the case may be.

In particular, in a network constructed with a plurality of network nodes including a base station, it is apparent that various operations performed for communication with a terminal can be performed by a base station or other networks except the base station. The term 'base station (BS)' may be substituted with such a term as fixed station, Node B, eNode B (eNB), advanced based station (ABS), access point or the like.

Moreover, the term 'terminal' may be substituted with such a term as mobile station (MS), user equipment (UE), subscriber station (SS), mobile subscriber station (MSS), mobile terminal, or advance mobile station (AMS) or the like.

A transmitting end refers to a fixed and/or mobile node that provides a data service or a voice service and a receiving end refers to a fixed and/or mobile node that receives a data service or a voice service. Accordingly, in uplink, a user equipment may become a transmitting end and a base station may become a receiving end. Similarly, in down link, a user equipment may become a receiving end and a base station may become a transmitting end.

The embodiments of the present invention may be applied to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (Universal Terrestrial Radio Access) or CDMA 2000. TDMA can be implemented with such a radio technology as GSM/GPRS/EDGE (Global System for Mobile communications/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc.

UTRA is a part of UMTS (Universal Mobile Telecommunications System). The UMTS is a 3rd generation (3G) asynchronous mobile communication system operating in Europe system-based wideband code division multiple access (WCDMA), global system for mobile communications (GSM), and general packet radio service (GPRS). 3GPP (3rd Generation Partnership Project) LTE (long term evolution) is a part of E-UMTS (Evolved UMTS) that uses E-UTRA (Evolved UTRA). The 3GPP LTE adopts OFDMA in downlink and adopts SC-FDMA in uplink. LTE-A (LTE-Advanced) is an evolved version of the 3GPP LTE.

Although the present invention will be described mainly with reference to 3GPP LTE/LTE-A system for clear explanation of the technical features of the present invention, the technical features of the present invention are not limited thereto. And, specific terminologies used in the following description are provided to help the understanding of the present invention and the specific terminology can be modified to a different form within a scope of the technical idea of the present invention.

A 'cell' described in the embodiments of the present invention may be configured with a combination of downlink resources basically. Alternatively, it may be configured with a combination of the downlink resources including optional uplink resources. In this case, a linking between a carrier frequency for the downlink resources and a carrier frequency for the uplink resources is specified in a system information (SI), which is transferred through the downlink resources.

In addition, as coverage of a base station, the term 'cell' means a specific frequency area or a specific geographical area. However, for the convenience of the explanation, the 'cell' may be used as the same meaning as the base station. For instance, a macro base station and a macro cell can be used as the same meaning and a small base station and a small cell can be used as the same meaning. However, if 'cell' and 'base station' are explicitly distinguished with each other, they are understood as the original meanings respectively.

Hereinafter, the 3GPP LTE/LTE-A system will be described as an example of the wireless access system to which the embodiment of the present invention can be applied.

1. 3GPP LTE/LTE-A System 1.1 LTE/LTE-A Network Structure

Hereinafter, described is a network structure available in the 3GPP LTE/LTE-A system to which the embodiment of the present invention can be applied.

FIG. 1 is a block diagram illustrating a network structure of E-UMTS.

E-UMTS can be called an LTE system as well. A communication network provides various communication services such as audio, VoIP (Voice over IP) via IMS (IP Multimedia Subsystem), and packet data in a manner of being extensively arranged.

As shown in FIG. 1, E-UMTS network includes an evolved UMTS terrestrial radio access network (E-UTRAN), an evolved packet core (EPC) and more than one user equipment. E-UTRAN may include at least one evolved node B (eNB) 20 and a plurality of user equipments (UEs) 10 can be positioned in a single cell. More than one E-UTRAN mobility management entity/system architecture evolution (MME/SAE) gateway 30 can be connected to an external network in a manner of being positioned at the end of a network.

The eNB 20 provides an end point of a user plane and a control plane to the UE 10. The MME/SAE gateway 30 provides the end point of a session and a mobility management function to the UE 10. The eNB 20 and the MME/SAE gateway 30 can be connected to each other via an S1 interface.

In general, the eNB 20 is a fixed station communicating with the UE 10 and can be called a base station (BS) or an access point. One eNB 20 can be assigned to every cell. An interface for transmitting user traffic or control traffic can be used between eNBs 20.

The MME performs various functions including NAS (Non-Access Stratum) signaling for the eNB 20, NAS signaling security, AS (Access Stratum) security control, inter-CN (inter-Core Network) node signaling for mobility between 3GPP access networks, idle mode UE reachability (including control and execution of paging retransmission), tracking area list management (for idle and active mode of UEs), selection of PDN GW and serving GW, MME selection for a handover with which a change of the MME is accompanied, SGSN (Serving GPRS Support Node) selection for a handover to a 2G or 3G 3GPP access network, roaming, authentication, bearer management including a dedicated bearer configuration, support for PWS (Public Warning System) (including ETWS (Earthquake and Tsunami Warning System) and CMAS) message transmission.

The SAE gateway host provides various functions including a per-user based packet filtering (e.g., the use of a K packet test), a lawful interception, UE IP address assignment, transmission port level packet marking in downlink, UL and DL service level charging, gating and rating reinforcement, DL rate reinforcement based on APN-AMBR (Access Point Name-Aggregated Maximum Bit Rate).

For clarity of the explanation, the MME/SAE gateway 30 is simply called a 'gateway' in the present specification. However, the MME/SAE gateway 30 includes both of the MME and the SAE gateway.

A plurality of nodes can be connected to each other between the eNB 20 and the gateway 30 through the S1 interface. The eNBs 20 can access to each other through an X2 interface and neighboring eNBs may form a mesh network structure with the X2 interface.

Figure 2:
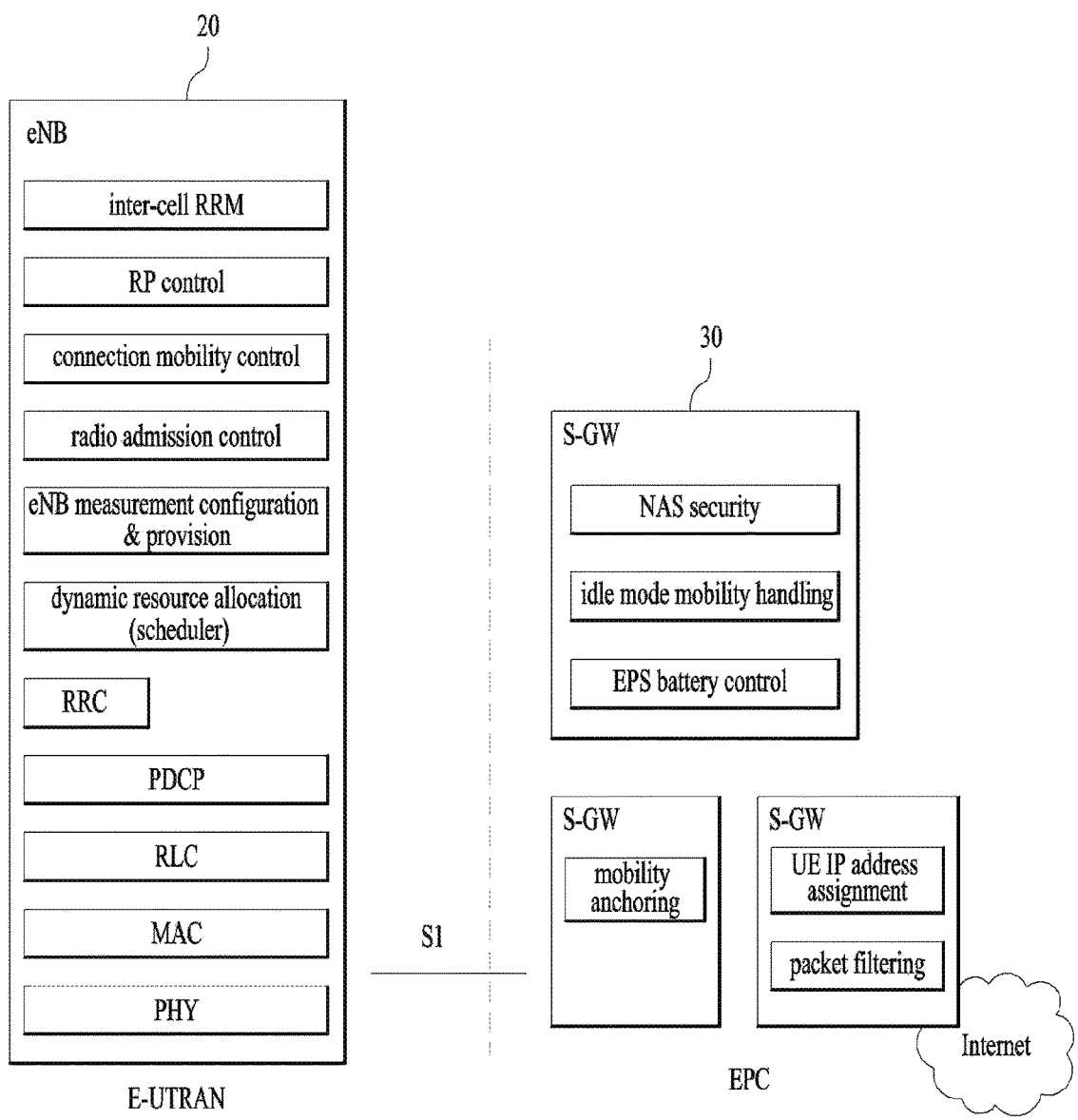
FIG. 2 is a block diagram for structures of general E-UTRAN and a general gateway 30.

FIG. 2 is a block diagram for structures of general E-UTRAN and a general gateway 30.

As shown in FIG. 2, the eNB 20 may perform functions of selecting the gateway 30, routing to the gateway 30 during activation of radio resource control (RRC), scheduling and transmitting a paging message, scheduling and transmitting a BCCH (Broadcast Control CHannel) information, allocating dynamic resources for the UEs 10 in both UL and DL, configuring and preparing eNB measurement, controlling a radio bearer, radio admission control (RAC), and connectivity mobility control in an LTE_ACTIVE state. In an EPC (Evolved Packet Core), the gateway 30 may perform functions such as paging transmission, LTE_IDLE state management, user plane encryption, SAE bearer control, NAS (Non-Access Stratum) signaling encryption and integrity protection.

Figure 3:
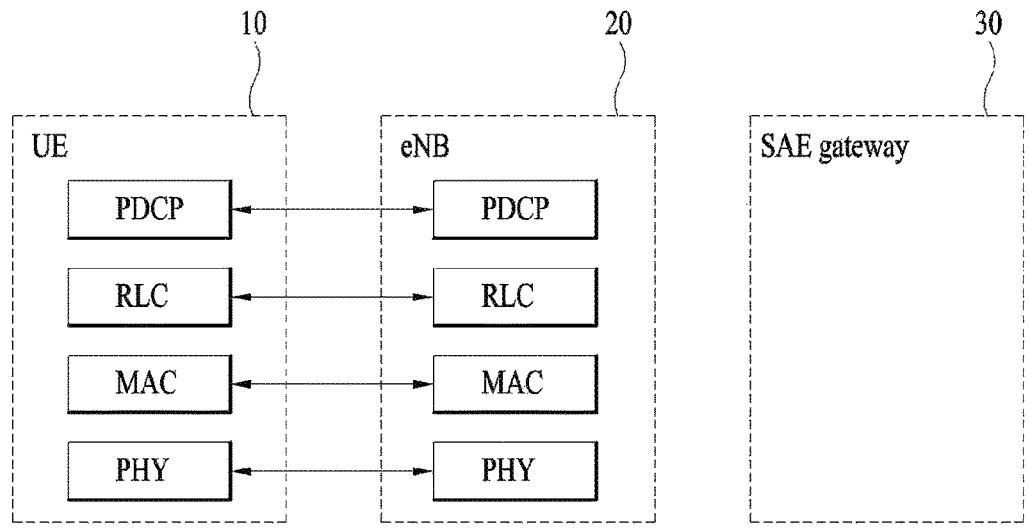
FIG. 3 and FIG. 4 are block diagrams of user-plane protocol and control-plane protocol stacks for E-UMTS.
Figure 4:
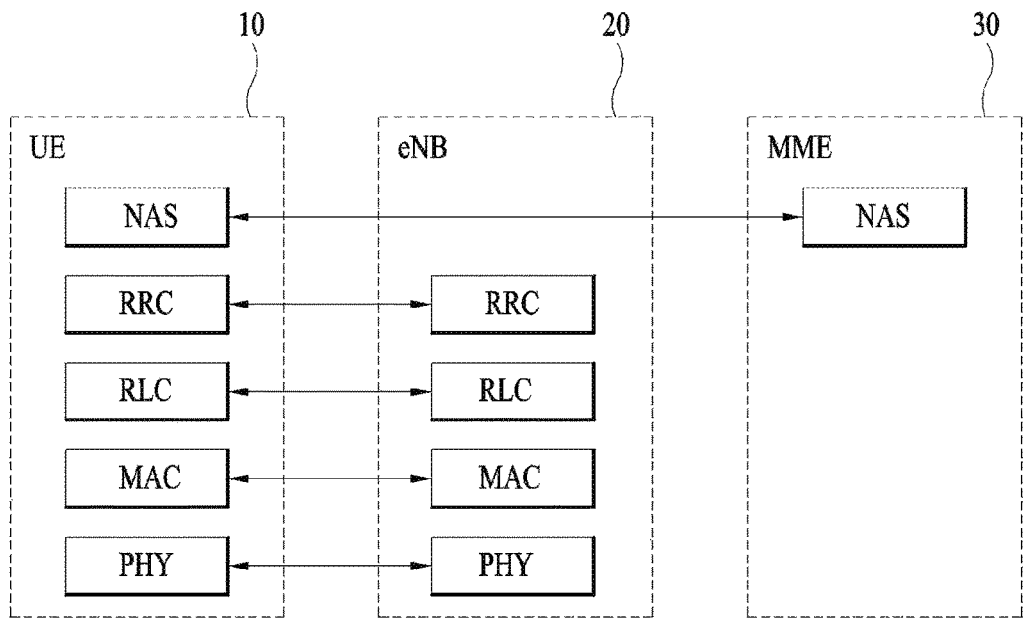

FIG. 3 and FIG. 4 are block diagrams of user-plane protocol and control-plane protocol stacks for E-UMTS.

As shown in FIG. 3 and FIG. 4, protocol layers can be divided into a first layer (L1: Layer 1), a second layer (L2: Layer 2), and a third layer (L3: layer 3) based on three lower layers of OSI (Open System Interconnection) standard model well known in to the art of communication systems.

A physical layer (PHY), i.e., the first layer (L1) provides an information transmission service to an upper layer using a physical channel. The physical layer is connected to an MAC (Medium Access Control) layer located at an upper level through a transport channel Data is transferred between the MAC layer and the physical layer through the transport channel Data is also transferred through a physical channel between different physical layers, e.g., between a physical layer of a transmission end and a physical layer of a reception end.

The MAC layer, which belongs to the second layer (L2), provides services to an RLC (Radio Link Control) layer corresponding to an upper layer through a logical channel. The RLC layer of the second layer (L2) supports reliable data transmission. Although the RLC layer is shown in FIG. 3 and FIG. 4, it should be noted that the RLC layer is not required when the MAC layer performs an RLC function.

A PDCP (Packet Data Convergence Protocol) layer, which belongs to the second layer (L2), performs a header compression function of reducing unnecessary control informations. The header compression function enables the data using such an internet protocol (IP) packet as IPv4 or IPv6 to be efficiently transmitted through a radio interface having a relatively narrow bandwidth.

A radio resource control (RRC) layer situated at a lowest part of the third layer (L3) is defined in a control plane only and controls the logical channel, the transport channel, and the physical channel in relation to configuration, re-configuration, and release of radio bearers (RBs). The RB indicates a service provided by the second layer (L2) for data transmission between the UE 10 and E-UTRAN.

As shown in FIG. 3, the RLC and MAC layers are ended in the eNB 20 of the network and may perform function such as scheduling, ARQ (Auto Retransmission reQuest) and HARQ (Hybrid-ARQ). The PDCP layer is terminated in the eNB 20 of the network and may perform user plane functions such as header compression, integrity protection, and encryption.

As shown in FIG. 4, the RLC and MAC layers are terminated in the eNB 20 of the network and perform the same functions as in the control plane. As shown in FIG. 4, the RRC layer is terminated in the eNB 20 of the network and may perform functions such as broadcasting, paging, RRC connectivity management, radio bearer (RB) control, mobility function, and UE measurement report and control. As shown in FIG. 4, a NAS control protocol is terminated in the MME of the gateway 30 of the network and may perform functions such as SAE bearer management, authentication, LTE_IDLE mobility handling, LTE_IDLE paging transmission, and security control for signaling between the gateway 30 and the UE 10.

An RRC state can be divided into RRC_IDLE and RRC_CONNECTED, which are different from each other.

In an RRC_IDLE state, the UE 10 may receive broadcast of a system information and a paging information during DRX (discontinuous reception) configured by the NAS, the UE may be assigned an ID uniquely identifying the UE in a tracking area, and the UE may perform PLMN (Public Land Mobile Network) selection and cell re-selection. In the RRC_IDLE state, no RRC context is stored in the eNB.

In an RRC_CONNECTED state, the UE 10 has an E-UTRAN RRC connection and the RRC context in E-UTRAN. Thus, it is possible for the UE 10 to transmit and/or receive data to/from the eNB. Moreover, the UE 10 may report a channel quality information and a feedback information to the eNB.

In the RRC_CONNECTED state, E-UTRAN recognizes a cell to which the UE 10 belongs. Hence, the network transmits/receives data to/from the UE 10, the network may control an order of inter-RAT (Inter-Radio Access Technology) cell change to GERAN (GSM EDGE Radio Access Network) having mobility (e.g., handover, NACC (Network Assisted Cell Change)) of the UE, and the network may perform cell measurement for a neighboring cell.

In RRC_IDLE mode, the UE 10 specifies a paging DRX (discontinuous reception) cycle. Specifically, the UE 10 monitors a paging signal on a specific paging occasion of every UE-specific paging DRX cycle.

1.2 Initial Access Procedure

In the LTE/LTE-A system, an initial access procedure may include a cell search procedure, a system information acquisition procedure, and a random access procedure. Since the embodiments of the present invention are devised to be applied to an initial access procedure performed in a small cell environment or an ultrahigh frequency band, a new and rapid initial access procedure is required rather than that of the conventional cellular system. Through the new and rapid initial access procedure, a UE can access an eNB more rapidly in order to transceive data. Thus, throughput improvement of the entire cell can be achieved.

Figure 5:
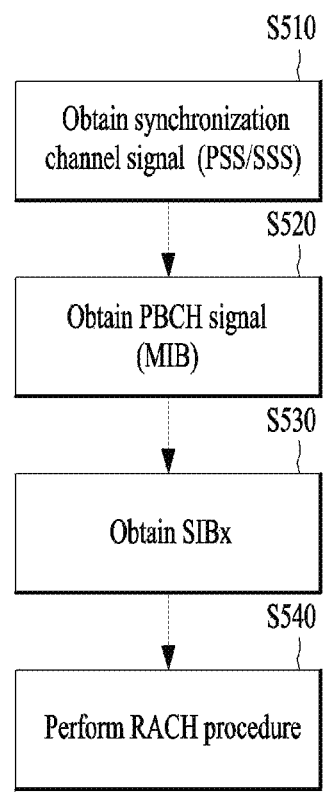
FIG. 5 illustrates a subframe structure of an LTE-A system according to cross-carrier scheduling used in the embodiments of the present invention.

FIG. 5 is a diagram for one example of an initial access procedure used in LTE/LTE-A system.

A UE can obtain a downlink synchronization information by receiving synchronization signals (e.g., PSS (Primary Synchronization Signal) and SSS (Secondary Synchronization Signal)) transmitted from an eNB. The synchronization signals are transmitted twice in every frame (10 ms unit) [S510].

The downlink synchronization information obtained in the step S510 may include PCID (Physical Cell ID), downlink time and frequency synchronization, CP (Cyclic Prefix), a length information and the like.

Subsequently, the UE receives a PBCH (physical broadcast channel) signal, which is transmitted through PBCH. In this case, the PBCH signal is transmitted 4 times in 4 frames (i.e., 40 ms) [S520].

The PBCH signal includes MIB (Master Information Block) as one system information. One MIB has a total size of 24 bits and 14 bits of the total 24 bits are used for indicating a PHICH (physical HARQ indication channel) configuration information, downlink cell bandwidth, and SFN (system frame number). The remaining 10 bits are set as reserved bits.

Thereafter, the UE may obtain remaining system informations by receiving different SIBs (system information blocks) transmitted by the eNB. The SIBs are transmitted on DL-SCH and presence or non-presence of SIB can be checked through a PDCCH signal masked with SI-RNTI (System Information Radio Network Temporary Identities) [S530].

Among SIBs, system information block type 1 (SIB1) includes an information on scheduling on time axis for other SIBxs (x=1, 2, 3, . . . , n) and parameters, which are necessary to determine whether a corresponding cell is suitable for cell selection. System information block type 2 (SIB2) includes a common channel information and a shared channel information. SIB3 to SIB8 include a cell re-selection related information, an information on an inter-frequency, an information on an intra-frequency, and the like. SIB9 is used to transfer a name of a home eNB (HeNB). SIB10 to SIB12 includes an ETWS (Earthquake and Tsunami Warning service) notification and a CMA (Commercial Mobile Alert System) warning message. SIB13 includes an MBMS related control information.

The UE may perform the random access procedure through the steps S510 to S530. Particularly, if receiving the SIB2 among the above-mentioned SIBxs, the UE may obtain parameters for transmitting a PRACH (physical random access channel) signal. In particular, by generating and transmitting the PRACH signal using the parameters contained in the SIB2, the UE may perform the random access procedure with respect to the eNB [S540].

The initial access procedure mentioned with reference to FIG. 5 can be also used in a small cell environment to which the embodiments of the present invention are applied. However, the procedures described with reference to FIG. 5 may be modified in accordance with the small cell environment. Hereinafter, the small cell environment to which the embodiments of the present invention are applied will be described.

2. Small Cell Environment

In the embodiments of the present invention, a small cell can be explained as a combination of DL resources (i.e., component carriers) or a combination of the DL resources including optional UL resources. A linking between a carrier frequency for the DL resources and a carrier frequencies of the UL resources may be indicated by a system information transmitted through the DL resources 2.1 Heterogeneous Network Deployment FIG. 6 is a diagram for one example of heterogeneous network deployment.

To guarantee a more stable data service such as multimedia service in a next-generation mobile communication system, attention has been paid to the introduction of a hierarchical cell structure or heterogeneous cell structure in which small cells such as a micro cell, a pico cell and/or a femto cell for low-power/short-range communication coexist together with a homogeneous network based on a macro cell.

The reason for this is that additional installation of a macro cell in the conventional eNB deployment environment is inefficient in terms of cost and complexity in comparison with system performance improvement. The structure of the heterogeneous network considered for the current communication network can be formed as illustrated in FIG. 6.

Figure 6:
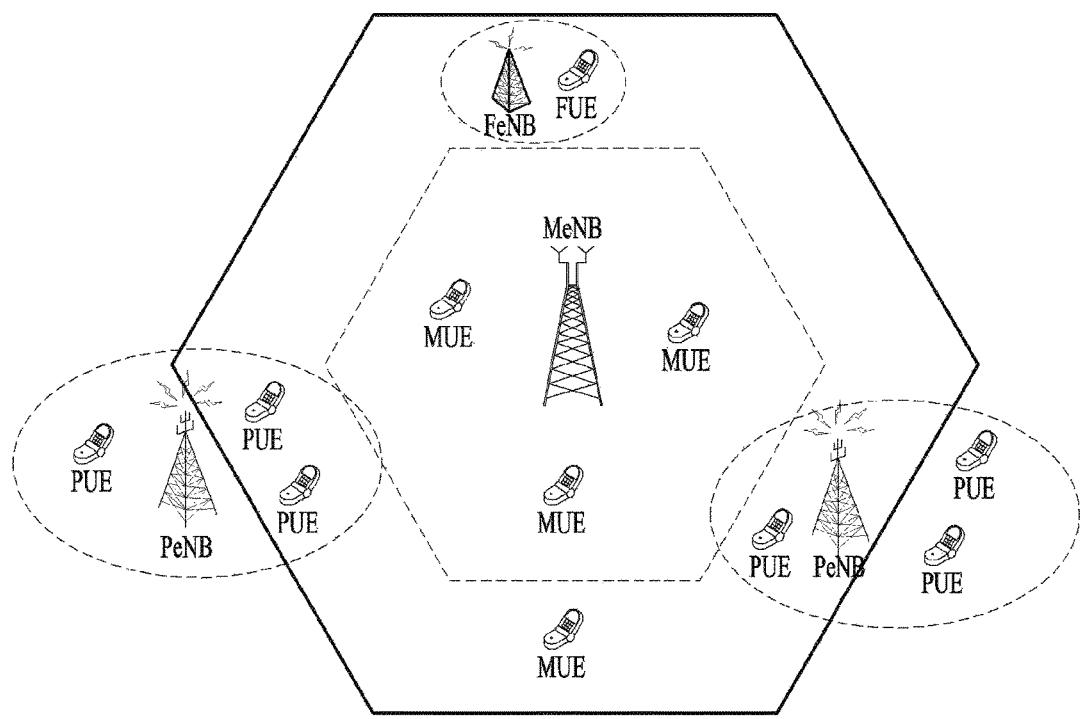
FIG. 6 is a diagram for one example of a procedure for connected mode handover in an LTE system.

In FIG. 6, an eNB that manages and covers a macro cell is defined as a macro eNodeB (MeNB) and a UE operating in the macro cell of the MeNB is defined as a macro UE (MUE). Moreover, an eNB that manages and covers a pico cell is called a pico eNodeB (PeNB) and a UE scheduled in the pico cell of the PeNB is called a pico UE (PUE). Furthermore, an eNB that manages and covers a femto cell is called a femto eNodeB (FeNB) and a UE scheduled by the FeNB is called a femto UE.

Referring to FIG. 6, a plurality of micro cells may coexist in one macro cell. In this case, micro cells are allocated resources according to a cell coordination scheme and then serve corresponding UEs. The micro cells may be classified depending on an access scheme.

(1) OSG (Open access Subscriber Group) type: In case of an OSG type of a micro cell, an existing macro UE or other micro UEs are allowed to access the corresponding cell. And, a handover into the corresponding cell or a macro cell can be performed. The OSG type can be called NCSG (Non Close access Subscriber Group).

(2) CSG (Close access Subscriber Group) type: In case of a CSG type of a micro cell, an existing macro UE or other micro UEs are not allowed to access the corresponding cell without to authentication. Thus, a handover into the corresponding cell or a macro eNB cannot be performed.

2.2 RRH (Remote Radio Head)

An RRH (remote radio head)/CoMP technology, a software modem technology and a cloud computing technology corresponds to technologies for enabling the network cloud. Among the above technologies, the RRH is a core technology that enables the network cloud in a radio access network field. The RRH is a very important element in terms of wireless transmission. Moreover, the RRH also works as motivation for making an innovative change in a radio access network structure.

Figure 7:
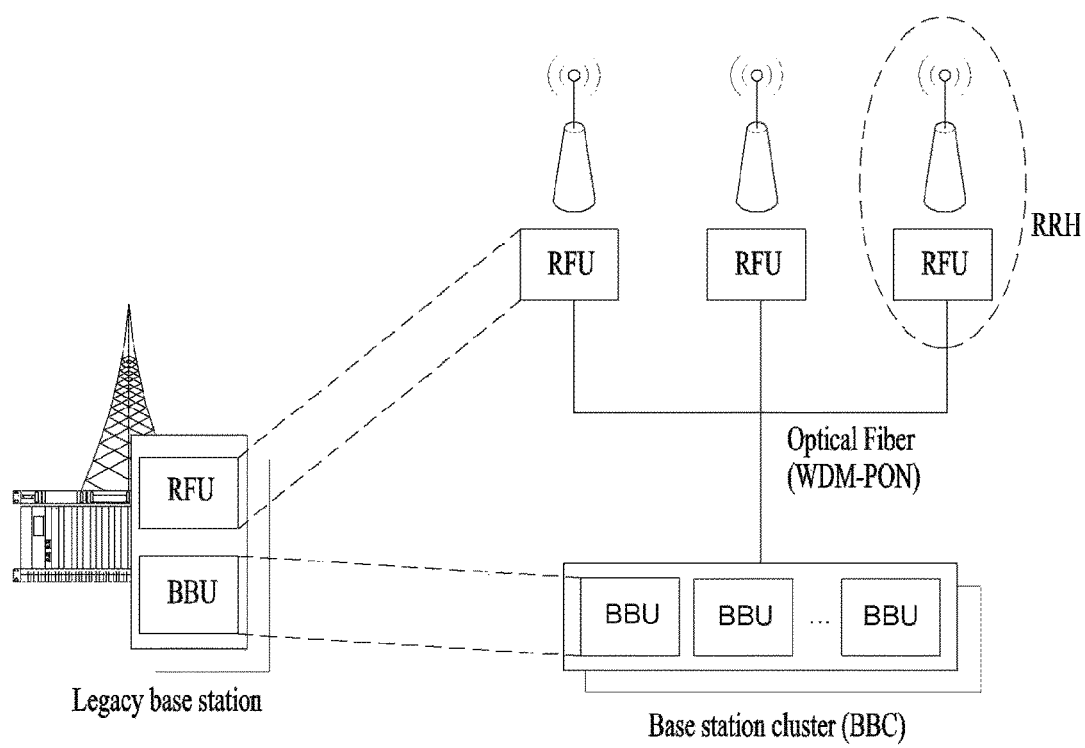
FIG. 7 is a diagram for one example of heterogeneous network deployment.

FIG. 7 is a diagram to explain a concept of RRH.

Although the RRH is developed as one type of an optical relay, the RRH is recently used as a core element for implementing a centralized base station. In particular, due to the introduction of the RRH, RFU (radio frequency unit) and BBU (baseband unit) are physically separated from each other. Thus, the physical eNBs mentioned with reference to FIG. 1 do not need to exist in a manner of being distributed anymore. In case of a recently introduced cloud access network, the network can be managed in a manner that a single equipment is interworking with hundreds of RRHs. Consequently, a cell (or eNB) different from the concept of the conventional cell (or eNB) is formed.

Until a 4G communication system (e.g., LTE/LTE-A system), all operations of a radio access network are defined based on a cell. However, as mentioned in the foregoing description with reference to FIG. 7, it is necessary to newly establish a concept of a cell due to the structural change in a cell.

In the current 3GPP, various implementation scenarios for a situation that an RRH and a macro eNB coexist are under discussion through Release 11 CoMP (Coordinated Multi-Point) Work Item. For instance, like a SAS (shared antenna system), a study of a concept of sharing a single RRH by a plurality of cells is progressing. And, a study of a concept of dynamically changing a cell area by controlling an RRH cluster depending on a situation is also progressing. In these trends, an interest in a recently proposed C-RAN (cloud radio access network) project is considerably increasing.

Figure 8:
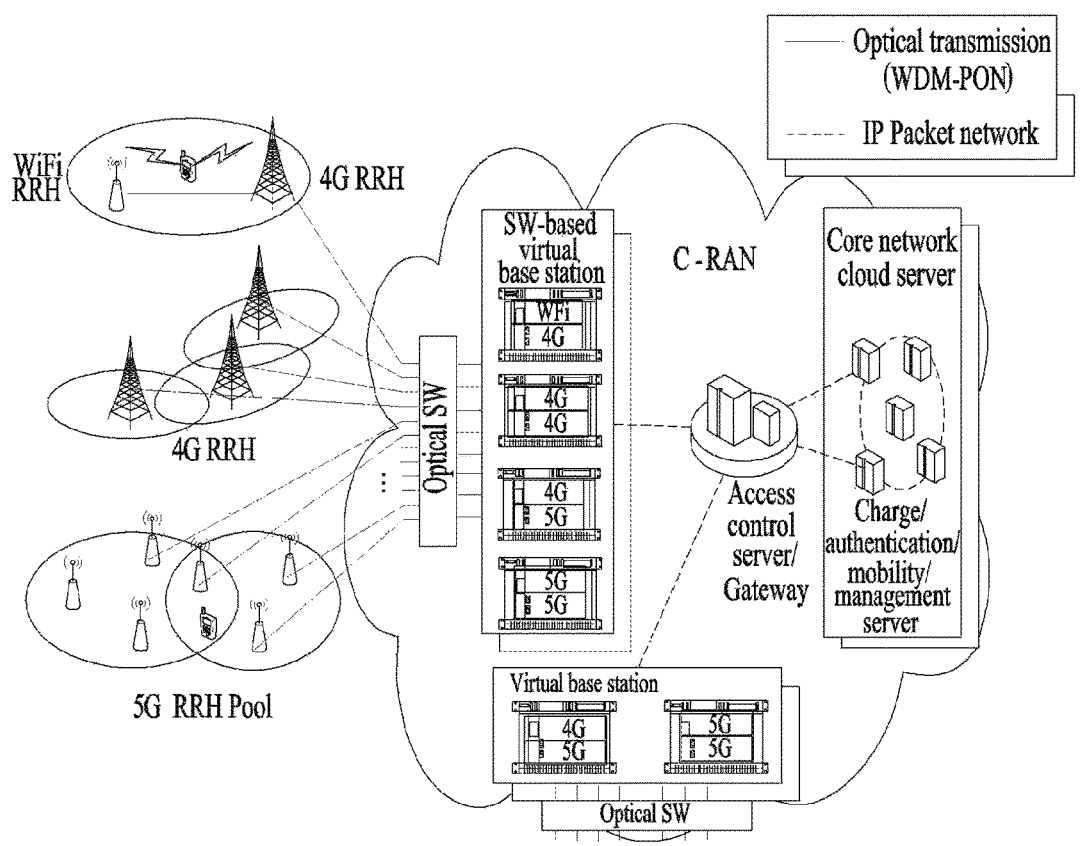
FIG. 8 is a diagram to describe a concept of C-RAN.

FIG. 8 is a diagram to explain a concept of C-RAN.

The C-RANS can include a plurality of RRHs, a software-based virtual base station (VBS), an access control server controlling the VBS, a resource management/authentication server, and the like. As mentioned in the foregoing description, as elements of a core network are changed to an open IP network, various elements of the C-RAN are directly interconnected with the elements of the core network in a systematic relationship.

Referring to FIG. 8, a plurality of the RRHs access a virtual base station through an optical access equipment. The virtual base station is implemented by software and may be implemented using various radio access technologies such as LTE, HSPA, WiMAX/WiFi and the like. One or a plurality of the RRHs are controlled by one virtual base station. According to the related art, a cell area used to be fixed. However, according to the C=RAN, a cell can be dynamically assigned in a manner that the virtual base station or the access control server changes the RRH cluster dynamically.

2.3 Cell Information Transmission

In case that a cell is configured in a legacy system including LTE Rel-8/9/10/11 systems, an information on a specific cell such as parameters related to operations of the corresponding cell is transmitted to UEs through SIB (System Information Block). MIB (Master Information Block) transmitted through PBCH (physical broadcast channel) includes parameters necessary for UEs to perform initial access to a specific cell. In this case, the MIB is transmitted at every time interval of 40 ms. And, other SIBxs are transmitted through PDSCH (physical downlink share channel).

In this case, the SIBxs include a cell resource configuration related information, an access class barring information, and an information on a cell reselection parameter, an information on a frequency selection parameter, and the like. Particularly, after receiving the MIB, a UE receives SIB1. In addition, since the UE may also receive a scheduling information of another SIBx on which dynamic scheduling is performed, it may take a considerably long time until receiving other SIBxs i.e., from SIB2 to SIB13. In this case, there may occur a case that even if a UE receives SIBx of the specific cell, the UE is unable to communicate with the corresponding cell.

For instance, after receiving a DL synchronization signal such as PSS or SSS, a UE detects PCID (Physical Cell ID) using the received DL synchronization signal. Subsequently, the UE may obtain a physical layer information of a corresponding cell by detecting the MIB. The UE receives the SIB1 on the basis of the PCID. The UE may detect a CSG indication information, which informs whether HeNB (home enhanced NodeB) supports a CSG cell, and CSG identity from the SIB1. The HeNB means a very small mobile communication base station installed indoors like home, office or the like.

In this case, if the UE is not registered in such a CSG cell, the UE is unable to communicate with the CSG cell. In other words, after performing all the above-mentioned processes, i.e., all the processes until reception of the SIB1, the UE may be aware of that communication with the CSG cell is impossible. If a CSG indicator is informed a UE in advance, a UE that does not have CSG capability may try to access a different cell without attempting to check a cell information of the corresponding cell.

In particular, in a communication environment having a number of small cells (e.g., femto cell or pico cell) deployed therein, if a UE performs an initial access procedure with respect to each of a number of the small cells, it may cause excessive increase in a load of the UE and critical power consumption of the UE. Therefore, if the UE receives the cell information related to the corresponding cell before receiving SIBx, MIB or the like, the UE is able to determine whether to access the corresponding cell more rapidly.

In the embodiments of the present invention, proposed are methods for a UE to obtain a cell information on a corresponding cell through a DL synchronization signal more rapidly before acquiring SIBx.

3. Method of Receiving Cell Information 3.1 Cell Information

DL synchronization information transmitted through a PSS/SSS signal is described with reference to FIG. 5. However, a cell information used in the embodiments of the present invention is different from the above-mentioned DL synchronization information and may include (1) ETWS (Earthquake and Tsunami Warning System) indicator and CMAS (Commercial Mobile Alert System) indicator, which correspond to PWS (Public Warning System) related information, (2) HeNB related information, (3) cell state and cell reservation related information, (4) cell load related information, (5) information related to transmission power of RRH (or eNB), (6) C-RAN indicator (or RRU indicator), (7) BBU ID information, and (8) layer level information.

Figure 9:
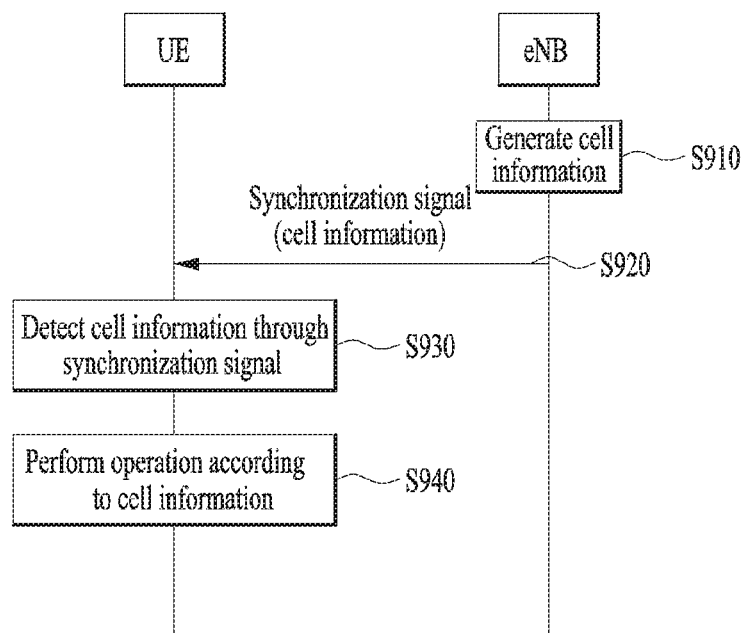
FIG. 9 is a diagram to describe one of methods of transmitting and receiving a cell information according to the present invention.

FIG. 9 is a diagram to describe one of methods of transmitting and receiving a cell information according to the present invention.

Referring to FIG. 9, an eNB (e.g., RRH, HeNB, etc.) generates the aforementioned cell information. Thereafter, the eNB mar broadcast the generated cell information using a DL synchronization signal [S910, S920].

By receiving the DL synchronization signal, a UE may detect the cell information of the corresponding eNB [S930].

Moreover, the UE may determine whether to perform an initial access procedure with respect to the corresponding eNB or to reselect a different eNB, according to the cell information. Subsequently, the UE may perform operations according to the cell information [S940].

Hereinafter, details of the cell information are described and then operations performed by the UE in the step S940 are explained.

3.1.1 PWS Information 3.1.1.1 ETWS (Earthquake and Tsunami Warning System) Indicator In the LTE Rel-8 system, ETWS (Earthquake and Tsunami Warning System), one of PWSs (Public Warning Systems), transmits an ETWS indicator to UEs through a paging message for a UE having capability of receiving a warning notification message located in notification areas. In this case, the paging message is a message that can be received after access and registration to a corresponding eNB. After receiving the ETWS indicator included in the paging message, the UE receives SIB10/11. And, the UE may check the occurrence of an earthquake and/or a tsunami through the ETWS indicator corresponding to the warning notification message.

Unlike the conventional network system, according to the embodiments of the present invention, the ETWS indicator is transmitted to UEs through a DL synchronization signal instead of the paging message. Thus, a UE may receive the ETWS indicator through the DL synchronization signal in advance before receiving the paging message. In particular, compared to the conventional method, the UE is able to detect a warning signal rapidly. Therefore, it is possible to react to a natural disaster instantly.

For instance, after sensing an earthquake and/or a tsunami, ETWS may set an ETWS indicator to '1' and then transmit the ETWS indicator set to '1' using a DL synchronization signal transmitted by an eNB (or RRH). Having received the DL synchronization signal transmitted by the eNB (or RRH), a UE checks that the ETWS indicator is set to '1' and may then know the occurrence of the earthquake and/or tsunami Hence, more rapid evacuation is possible.

In case that the UE intends to check more detailed informations, the UE can receive SIB10/11 messages transmitted by the eNB after receiving the ETWS indicator through the DL synchronization signal. When the earthquake and/or tsunami is not sensed, the ETWS may set the ETWS indicator to '0' and then transmit the ETWS indicator set to '0' using the DL synchronization signal.

3.1.1.2 CMAS (Commercial Mobile Alert System) Indicator

In the LTE/LTE-A system, CMAS, one of PWSs, also transmits a CMAS indication message to a UE through a paging message. After receiving the CMAS indication message, the UE may receive an announcement message for a specific situation contained in a CMAS notification message by receiving SIB12. Through the above processes, the UE is able to recognize and evacuate from natural disasters.

In the embodiments of the present invention, a CMAS indicator may be transmitted to a UE through a DL synchronization signal instead of the paging message. In this case, since the UE obtains DL synchronization before receiving the paging message, the UE is able to receive the CMAS indicator in advance. Compared to the conventional method, since the UE rapidly detects presence or non-presence of a warning signal, the UE is able to react to a natural disaster quickly. The CMAS indicator is configured similar manner to the aforementioned ETWS indicator.

The ETWS and CMAS are frequently used for the purpose of informing a risk 3.1.2 HeNB Related Information A HeNB has the following three types of access modes and operations of the HeNB are determined according to an access mode.

(1) Closed access mode: A HeNB belongs to one or more specific CSGs and only a UE corresponding to a member of the CSG, to which the HeNB belongs, can access the HeNB.

(2) Hybrid access mode: Similar to the closed access mode, a HeNB belongs to a specific CSG. However, in this case, the HeNB is able to provide services to all UEs. For a UE corresponding to a member of the CSG to which the HeNB belongs, the HeNB provides a preferential treatment service.

(3) Open access mode: A HeNB operates similar to a conventional eNB.

According to an access mode of a HeNB, a UE may be served by the corresponding HeNB or not. In case of a UE not included in the CSGs to which the HeNB belongs, the UE cannot be served by the HeNB. However, after obtaining DL synchronization with respect to the corresponding HeNB and receiving MIB and SIB1, the UE may obtain a CSG indicator (indication) and a CSG identity included in the SIB1 and then check the access mode of the HeNB. In particular, after performing an access procedure with respect to the HeNB to which the UE does not belong, the UE may check whether the UE can be served by the corresponding HeNB.

Therefore, a method of informing an access mode of a HeNB or whether a HeNB corresponds to CSG using a DL synchronization signal is proposed in the embodiments of the present invention.

For instance, if a close access indicator is set to '1', a corresponding HeNB is a CSG cell. And, if the close access indicator is set to '0', the corresponding HeNB is not the CSG cell. Thus, if a random UE intends to access a cell, the UE may check whether the corresponding cell is CSG in a manner of receiving a DL synchronization signal of the cell and detecting a close access indicator included in the DL synchronization signal.

If the UE does not have a configured CSG ID list or if the UE does not have capability of performing a connection to CSG, i.e., if the cell, which the UE intends to access, is a CSG cell, the UE does not perform an access procedure with respect to the corresponding cell.

As another embodiment, a HeNB may inform a UE of its access mode through a DL synchronization signal. For instance, it may be previously defined that the access mode indicator set to '00', '01' and '01' means the close access mode, the hybrid access mode and the open access mode, respectively.

Thus, having received the DL synchronization signal, the UE check the access mode indicator and may be aware of the access mode of the corresponding cell using a predefined table. As mentioned in the above description, the UE may determine whether to (re)select another cell or to access the corresponding cell depending on the access mode.

As another aspect of the present invention, an access mode of a HeNB can be informed in a manner of dividing 27 bits of a CSG ID or CSG ID value into previously defined regions.

In order for a UE to access close access mode of a cell, the UE should receive a CSG ID of the CSG cell. The UE checks a CSG ID received from a HeNB using the received CSG ID. By doing so, the UE may check whether it corresponds its CSG cell member and then perform access.

For instance, a network system divides a range of numbers that can be represented as the CSG ID into 8 sections (i.e., 8 CSG ID groups) and may inform through 3 bits of a CSG ID group indicator that which section a CSG ID of a specific CSG cell belongs to. For example, the range of the CSG ID may be uniformly divided into 8 sections. And, it may be configured that as a CSG ID is smaller, a CSG ID group are assigned to be smaller. In this case, a CSG cell having a CSG ID of '1000' may be mapped to a CSG group ID of '000'

In this case, a UE detects a close access indicator or access mode indicator through a DL synchronization signal. If a corresponding cell is a CSG cell, the UE receives a CSG group ID. Thereafter, the UE may determine whether to perform access in a manner of checking which section a CSG ID of the corresponding cell belongs.

If a CSG member ID to which the UE belongs is included in a CSG group that can be known through the CSG group ID received by the UE, the UE receives SIB1 of the corresponding cell and then obtains the CSG ID. Thereafter, after comparing it with its CSG member ID, the UE may determine whether to perform the access. Otherwise, the UE may not access the CSG cell.

In case that a UE receives such an information through a DL synchronization signal, the corresponding UE may be aware of whether it can be served though a HeNB in advance. According to the possibility of being served by the HeNB, the UE may determine whether to receive signals such MIB, SIB1 and the like later.

In particular, if a service cannot be provided to the UE through the HeNB, the UE discontinues an initial access procedure to access the HeNB and performs a new initial access procedure to access another cell. Therefore, it can be prevented that the UE performs an unnecessary initial access procedure.

3.1.3 Information Related Cell State and Cell Reservation

In the LTE/LTE-A system, a UE may check whether access to a specific cell is barred or it corresponds to a reserved cell in a manner of receiving a message including a cellbarred filed and/or a cellreservedForOperatorUse filed of SIB1.

In particular, there are the following three types of cells according to a cell state and cell reservation related information.

(1) Not barred and not reserved cell: In this cell, all UEs are able to perform camp-on.

(2) Not barred and reserved cell: In this cell, all UEs cannot perform camp-on but specific UEs can perform selection and/or reselection.

(3) Barred cell: A UE is not allowed to perform selection or reselection with respect to a barred cell. In other words, the UE cannot camp on the corresponding cell. In this case, the UE may not receive a barred service.

In case that such a cell state and cell reservation related information is transmitted through a DL synchronization signal, a UE may immediately check whether to camp on a corresponding cell by receiving the DL synchronization signal.

Compared to a case of obtaining a cell state and cell reservation related information through SIBx messages in the LTE/LTE-A system, if the above-mentioned method is applied, the information can be obtained rapidly. Moreover, a UE can rapidly determine whether to camp on a specific cell. If the UE cannot camp on the specific cell, the UE performs a procedure for selecting/reselecting other cells.

For instance, for the three types of cells mentioned in the foregoing description, 2 bits of a cell state and cell reservation related information may be transmitted through a DL synchronization signal. In particular, in the case of the not barred and not reserved cell, the cell state and cell reservation related information may be set to '00'. In the case of the not barred and reserved cell, it may be set to '01'. In the case of the barred cell, it may be set to '10'.

After receiving the cell state and cell reservation related information through a synchronization signal, a UE can rapidly determine whether to camp on a corresponding cell, compared to the conventional method. In case of a cell on which the UE cannot camp, the UE discontinues a procedure for cell selection/reselection.

3.1.4 Cell Load Information

In the legacy system (e.g., LTE/LTE-A system), a cell may not provide a service to a random UE in a situation that the cell has a lot of loads. In this case, since the UE does not have an information on the loads of the cell, the UE may perform an access procedure with respect to the cell if a signal strength of the corresponding cell is appropriate. However, the corresponding cell is unable to provide a service to the UE due to a lot of the loads. In order for the UE not to perform the access procedure with respect to the corresponding cell but to perform a search procedure and an access procedure for a different cell, the corresponding cell may generate and transmit a cell load information through a synchronization signal.

If a load related information of a corresponding cell (e.g., HeNB) is transmitted through a DL synchronization signal according to the present invention, a UE may determine whether to access the corresponding cell based on the cell load information. In this case, before performing an access procedure with respect to the cell managed by a HeNB, the UE may match DL synchronization with the corresponding cell and obtain the load information of the corresponding cell at the same time.

For instance, a HeNB may inform the amount of radio resource managed by a cell in a manner of dividing it into three steps i.e., high, medium and low. In particular, a cell load information has a size of 2 bits. The cell load information may be set to '00' in case that the amount of cell loads is low. It may be set to '01' in case that the amount of cell loads is middle. It may be set to '10' in case that that the amount of cell loads is high.

If a cell load information is set to 'high', a UE does not perform an initial access procedure anymore but receives a DL synchronization signal of a different cell in order to access the different cell. A UE is able to perform an access procedure with respect to a cell having a cell load information set to 'low' or 'middle'.

Moreover, in case that a UE (re)selects a cell, if signal strengths of candidate cells are similar to each other or if difference between the signal strengths of the candidate cells is not significant, a cell load information may be used for cell (re)selection. For instance, when the UE detects a plurality of cells having similar signal strengths during a cell search procedure, the UE may perform a procedure for accessing a cell having lowest loads based on the cell load information.

Alternatively, a cell load information may be represented as 1 bit. In particular, if the cell load information is set to '0', it indicates that a corresponding cell is able to provide a service to a specific UE. If the cell load information is set to '1', it indicates that the corresponding cell is unable to provide the service to the specific UE. Therefore, in the case of the cell load information set to '1', the UE does not perform a procedure for accessing the corresponding cell but performs a procedure for accessing a different cell.

In addition, an eNB may inform a UE of a cell load information in a manner of dividing it into a DL load information and a UL load information. In this case, the UE may obtain a DL load information and a UL load information of each cell by receiving a DL synchronization signal of each cell. Through such a load information, the UE may determine DL cells and/or UL cells that provide services to the corresponding UE.

For example, in case that a DL/UL load information of a $1^{st}$ cell (cell 1) corresponds to (high, low) and a DL/UL load information of a $2^{nd}$ cell (cell 2) corresponds to (low, high), a UE may selects the cells so that DL data is provided by the $1^{st}$ cell and UL data is provided by the $2^{nd}$ cell.

3.1.5 Transmission Power Information

In the conventional LTE/LTE-A system, a method of selecting a cell depending on a DL reception signal strength has been used. However, if UL data is transmitted to a cell having a higher DL reception signal strength, it may cause degradation in UL performance due to difference between transmission power of a macro cell and transmission power of a pico cell. For instance, even if an eNB of the macro cell is located further away than an eNB of the pico cell, if transmission power of the macro cell is much higher than that of the pico cell, output of the macro cell may be larger than that of the pico cell. In this case, according to the conventional system, the macro cell has a high probability of being selected as an access cell. However, if UL data is transmitted to the pico cell having a smaller path loss in spite of a lower DL reception signal strength, it may improve UL performance in respect of a UE. Moreover, transmission power may be configured different for each RRH. Furthermore, high transmission power may not guarantee a good channel depending on deployment of RRHs.

To solve such DL/UL coverage imbalance problem, a DL/UL split method is proposed. In particular, according to the method, a cell for DL service and a cell for UL service are physically separated.

Moreover, in the embodiments of the present invention, an RRH and/or a HeNB may transmit a transmission power information through a DL synchronization signal. In particular, a UE may select an optimized cell by combining the transmission power information received through the DL synchronization signal and the DL/UL split method.

In other words, the UE may receive the transmission power information of the RRH and/or the HeNB through the DL synchronization signal. In this case, if a serving DL cell is different from a serving UL cell, the UE may select a DL/UL cell using the transmission power information. For instance, by receiving the DL synchronization signal transmitted from the RRH, the UE obtains an RRH transmission power information transmitted together with the synchronization signal. The UE may select a cell having a smallest path loss as a UL cell based on the RRH transmission power information and signal strength (e.g., RSRP or RSRQ) detected using the DL synchronization signal, a reference signal, or a pilot signal and the perform a random access procedure.

Furthermore, a UE may consider a transmission power information of an RRH when selecting a cell according to mobility of the UE. For instance, in case of a high speed UE, if a handover is performed in order to connect a cell having small coverage, handover failure is highly likely to occur. In particular, in the case of the high speed UE, if mobility is guaranteed by performing a handover into a macro cell having large coverage, RLF (radio link failure) of the UE can be prevented.

In the conventional LTE/LTE-A system, a UE is unable to know a coverage information of each cell. Thus, the UE selects a serving cell according to a signal strength of a cell. According to a method of solving the above problem, a UE can select a cell by considering a transmission power information of an RRH, which is received through a DL synchronization signal, and its mobility information.

According to another aspect of the present invention, as a method of informing a transmission power information of an RRH or an eNB, the RRH or the eNB may represent the transmission power information as a specific value. Alternatively, the RRH or the eNB may previously define and divide into prescribed groups according to transmission power levels and then inform which group transmission power of the RRH belongs to.

For instance, if an RRH transmission power value is in the range of 43 dBm to 46 dBm, 2 bits of a transmission power information is set to '11'. It is assumed that if the RRH transmission power value is in the range of 30 dBm to 36 dBm, the transmission power information is set to '01'. Moreover, it is also assumed that the corresponding values are preset values and that a UE and an eNB already know have them as tables. In this case, if a UE located at a cell edge receives the transmission power information set to '11' through a DL synchronization signal of a $1^{st}$ cell, the UE can know that the RRH transmission power of the $1^{st}$ cell is in the range of 43 dBm to 46 dBm. And, if the UE receives the transmission power information set to '01' through a DL synchronization signal of a $2^{nd}$ cell, the UE can check that the RRH transmission power of the $2^{nd}$ cell is in the range of 30 dBm to 36 dBm. Thus, the UE may estimate a distance from the RRH in the $1^{st}$ cell and a distance from the RRH in the $2^{nd}$ cell based on the transmission power information.

Therefore, the UE may request a UL service to one, which has a small path loss, of the two RRH. In case that speed of the UE is high and that strengths of reception signals including pilot of the RRHs are similar to each other, the UE may select an RRH with a large transmission power value in order to select a cell that provides large coverage. The reason for this is that an RRH with small transmission power provides small coverage. In particular, an eNB with large coverage is suitable for the high speed UE since the UE performs handovers frequently.

Consequently, a UE can select a cell using a transmission power information transmitted through a DL synchronization signal and transmit such a cell selection information to an RRU.

3.1.6 C-RAN Indicator (or RRU Indicator)

It is illustrated in FIG. 8 that BBUs are centralized and RRUs are distributedly deployed in a manner of applying a C-RAN architecture. According to the embodiments of the present invention, among procedures performed before applying the aforementioned C-RAN architecture, specific procedures (e.g., a procedure for obtaining BBU ID and RRU ID using cell ID and/or a procedure for receiving a system information different from that of an existing cell only in case of performing HO into a different cell by changing a system information configuration) may be modified or omitted.

In particular, if the procedures are modified or omitted according to the C-RAN architecture as mentioned in the foregoing description, there is no problem in respect of a network since the network knows the modified or omitted procedures. However, a UE is unable to distinguish an existing network structure and the C-RAN architecture. Thus, it may cause a problem that the UE performs the modified or omitted procedures in the same manner as before the procedures are modified or omitted.

Therefore, it is preferred that an eNB (e.g., RRH or HeNB) informs that the C-RAN architecture is applied to a corresponding cell in a manner of transmitting a C-RAN indicator through a DL synchronization signal.

In particular, only after recognizing whether the corresponding cell adopts the C-RAN architecture, the UE can handle procedures that will be performed as procedure specialized for the C-RAN. Such a C-RAN indicator may be represented using 1 bit. It may be defined that the C-RAN indicator set to '0' means the existing network structure and the C-RAN indicator set to '1' means the C-RAN architecture.

If the C-RAN indicator, which is received by the UE through the DL synchronization signal, is set to '1', the UE recognizes that the corresponding cell adopts the C-RAN architecture and may then perform the procedures uniquely defined for the C-RAN network.

The C-RAN indicator is just a name and can be substituted with such a terminology as an RRU indicator or the like.

3.1.7 BBU Identifier Information

In the C-RAN architecture, a mapping relation of a BBU to which a specific RRU is connected can be dynamically changed. Moreover, an eNB (e.g., RRH, HeNB, etc.) may inform a UE of which BBU the specific RRU belongs to. The eNB may transmit such an information as RRU ID together with BBU ID through a DL synchronization signal. After receiving a BBU ID information, the UE measures CRS configured with the received BBU ID and RRU ID and then transmit a measurement report to an RRU.

Having received the measurement report through the RRU, the BBU may know whether to switch a specific UE to an RRU managed by the BBU or to perform a handover of the specific UE to an RRU managed by a different BBU. If the handover is performed, the BBU may also know which BBU the UE should perform handover to.

In particular, such a specific BBU ID may be set to x bits (where, x is a random positive integer). If a UE receives the above x bits, the UE may be aware of which BBU each RRH is mapped to.

3.1.8 Layer Level Information

In a situation that small cells are concentrated, if network synchronization is not correctly matched, significant interference may occur. In this case, a gain from applying such technologies as eICIC (enhanced Inter-Cell Interference Coordination), CoMP and the like may decrease. To solve this problem, many discussions have been made on technologies for matching network synchronization. Recently, a method of acquiring synchronization using multi-hop has been proposed. Moreover, since synchronization error may increase as the number of hops increases, a method of restricting the number of hops in the multi-hop has been considered.

Figure 10:
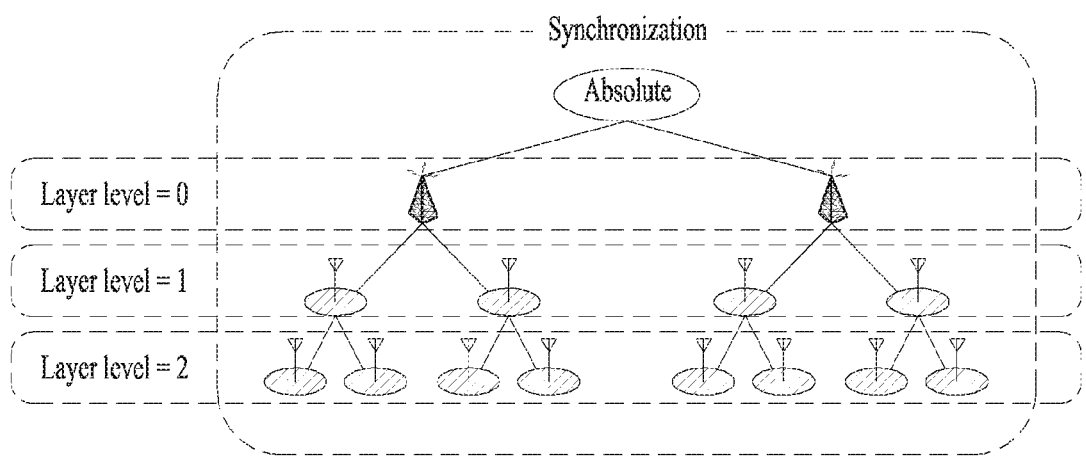
FIG. 10 is a diagram to describe a concept of a network structure according to layer levels.

FIG. 10 is a diagram to describe a concept of a network structure according to layer levels.

Referring to FIG. 10, it is assumed that a network is synchronized. In this case, a network entity with a highest layer level may be a macro eNB. The top layer level is set as LV=0. The medium layer level is set as LV=1 and a femto eNB and a pico eNB may be included. The bottom layer level is set to LV=2 and an RRH and the like may be included.

In an environment in which small cells mainly consisting of RRHs are concentrated, since the small cells correspond to cells with low layer levels, it may be advantageous for a UE to match synchronization with a network entity with a higher layer level according to a network environment or mobility of the UE.

Thus, the UE may need to obtain a layer level of a specific cell before matching network synchronization. Accordingly, an eNB and/or an RRH may transmit an information on a layer level through a synchronization signal. Having obtained such an information, a cell or the UE may obtain the layer level in advance and then match the network synchronization in consideration of the layer level. Moreover, the UE may select a cell to match synchronization with in consideration of the layer level together with the mobility of the UE.

Although synchronization matching with a low layer level of a cell is described in the embodiment of the present invention, it is for the convenience of the explanation and the present invention is non-limited thereto. Layer levels can be represented as bits. For instance, if a layer level is 3, it may be represented as 2 bits. And, if a layer level is 5, it may be represented as 3 bits. In addition, network entities corresponding to each layer level are exemplary and can be changed in accordance with each network configuration.

Cell informations described in 3.1.1 to 3.1.8 can be transmitted through the synchronization signal mentioned in the step S920 independently or through any combination of two or more informations. After receiving the cell informations included in the synchronization signal, a UE may perform the operations mentioned in 3.1.1 to 3.1.8 in the step S940.

Hereinafter, a method of configuring a cell information in the step S920 is described.

3.2 Method of Configuring Synchronization Signal including Cell Information

There may be a plurality of methods of transmitting a cell information through a DL synchronization signal.

Figure 11:
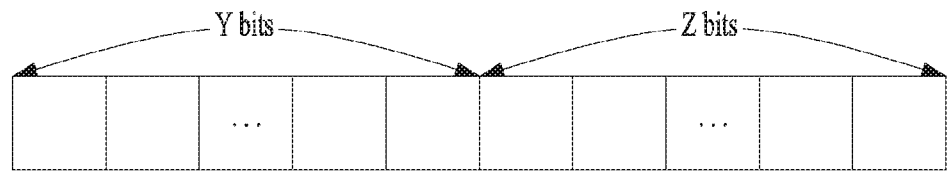
FIG. 11 is a diagram to describe a method of configuring a downlink synchronization signal in case of transmitting a specific cell information only.
Figure 11:
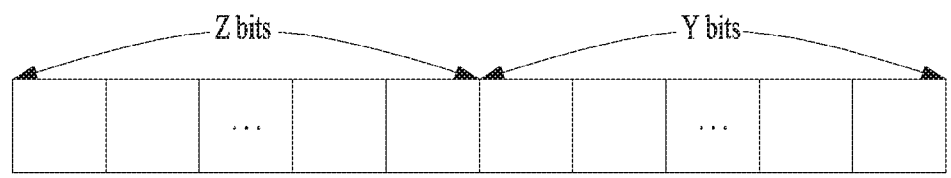

FIG. 11 is a diagram to describe a method of configuring a downlink synchronization signal in case of transmitting a specific cell information only.

Each cell may be previously configured to transmit at least one specific cell information among cell informations described in 3.1.1 to 3.1.8. Such a cell information may be set to y bits (where, y is a random positive integer) starting from LSB (least significant bit) or MSB (most significant bit) of the information, which a UE obtains by receiving a synchronization signal. In this case, the y bits for representing the cell information may be configured with one or more cell informations. Moreover, z bits (where, z is a positive integer) may represent a cell ID (e.g., PCID or RRH ID) drawn from the synchronization signal.

In case that the embodiments of the present invention are applied to the LTE/LTE-A system, the z bits may mean bits (e.g., cell ID in the LTE/LTE-A) reconfigured by demodulating PSS and SSS after receiving the corresponding signals.

The UE performs detection on the information obtained by receiving the DL synchronization signal according to the order in FIG. 11 (a) or FIG. 11 (b) and may then check the cell information and the cell ID. The UE may perform access to a corresponding cell or discontinue access in consideration of the cell information. In addition, the UE may perform operations in accordance with the cell information as mentioned in the foregoing description with reference to 3.1.

As another aspect, the y bits and the z bits consisting of the DL synchronization signal may be transmitted in a manner of being interleaved together according to a predefined method. In this case, a UE may receive the cell information and the cell ID by detecting the y bits and the z bits using the predefined method. The configuration order of y bits and z bits is not limited to FIG. 11 but can be changed variously.

Figure 12:
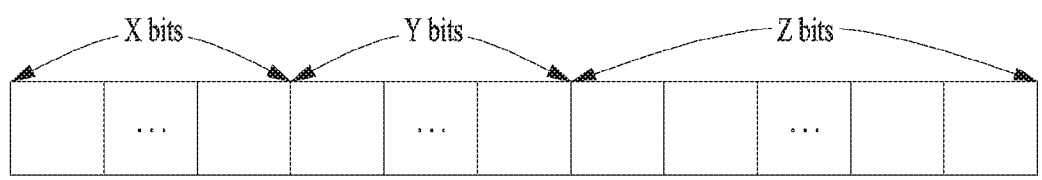
FIG. 12 is a diagram to describe a method of configuring a downlink synchronization signal in case that a cell information is dynamically changed.
Figure 12:
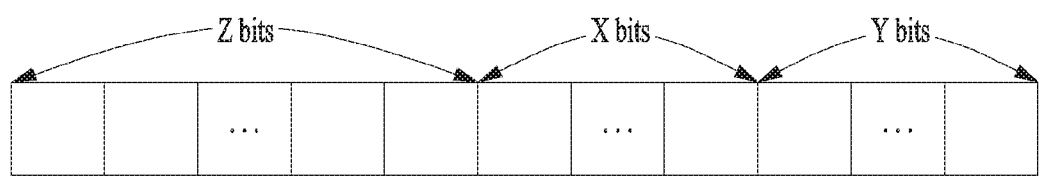

FIG. 12 is a diagram to describe a method of configuring a downlink synchronization signal in case that a cell information is dynamically changed.

A cell may dynamically select the cell informations described in 3.1 and then transmit the selected cell informations. In particular, the cell may dynamically select cell informations considered as important depending on a communication environment or a network environment and configure cell informations to be included in a DL synchronization signal. In this case, it is preferred that the synchronization signal additionally includes an indicator for indicating which cell informations are included in the synchronization signal.

A UE may detect an information obtained by receiving and demodulating the DL synchronization signal according to the number and the order of predefined bits and then detect the cell information and the cell ID. Accordingly, the UE may perform the operations mentioned in 3.1 using the corresponding information.

For instance, 8 types of the cell informations described in 3.1.1 to 3.1.8 may be included in y bits in FIGS. 12 (*a*) and (*b*). Moreover, in this case, x bits (where, x is a random positive integer) of a cell information indicator is necessary to inform which cell informations are included in the y bits. The x is assumed to be 3 bits. It may be previously defined that the x bits set to '000' indicates the PWS (public warning system) related information and the x bits set to '001' indicates the HeNB related information. As mentioned in the foregoing description, the x bits may previously set as a table for a cell and a UE. It is a matter of course that 8 types of the cell informations can be transmitted in the form of a bitmap.

The cell information and the cell information indicator may be set starting from LSB (least significant bit) or MSB (most significant bit) of the information, which the UE obtains by receiving the DL synchronization signal. Except the above x and y bits, z bits (where, z is a positive integer) may represent a cell ID (e.g., PCID or RRH ID).

An arrangement order of the x bits, y bits and z bits shown in FIGS. 12 (*a*) and (*b*) is just exemplary and it can be implemented using several methods in various ways. Moreover, the x bits, y bits and z bits may be transmitted in a manner of being interleaved together according to a predefined method. After receiving the interleaved x bits, y bits and z bit, a UE may receive the cell information and the cell related information by detecting the x bits, y bits and z bits in a manner of performing de-interleaving on them using the predefined method.

Although it is illustrated in FIG. 12 that one cell information among a plurality of the cell informations is transmitted, a plurality of the cell informations are included in the DL synchronization signal. To this end, a cell information ID and the cell related information may be arranged in the multiple forms. Of course, one cell information may be configured by being combined with another cell information and the cell information ID may be configured to indicate such a combination.

If the cell information is configured together with the cell ID and if the DL synchronization signal is divided into two types, i.e., PSS and SSS similar to the conventional LTE, the UE may distinguish the cell information and the cell ID after detecting both of the PSS and the SSS. Similar to the conventional LTE, a method of configuring the cell ID using a value detected from the PSS and a value detected from the SSS may be reused.

In this case, each of the cell information and the cell information ID may be transmitted in a manner of being included in the PSS and/or SSS. It is a matter of course that the cell information and the cell information ID are interleaved and then included in each of the PSS and/or SSS.

Alternatively, if the DL synchronization signal is configured with the PSS and the SSS similar to the LTE system, it may be preferred to transmit the cell information and/or cell information ID through the PSS. The reason for this is that if a UE receives the above-mentioned cell informations as fast as possible, the UE can rapidly determine whether to continue an access procedure with respect to a corresponding cell or to discontinue and start an access procedure with respect to a different cell.

As another aspect of the present invention, a cell information indicator may be implemented in a manner different from that in FIG. 12. For instance, in the LTE system, a UE may select 3 root indices through a PSS and then map a cell ID to 0, 1 and 2 values, respectively. In particular, it may be predefined that the root indices obtained by the UE through the PSS are extended to 6 indices and the indices are mapped to '000', '001', '010', '100', '101' and '110', respectively. The UE maps the root indices obtained through the PSS of the DL synchronization signal to the predefined values and may then recognize it as the proposed indicator for the cell information using 1 bit of MSB. Alternatively, the root indices may be mapped to values including an indicator for informing which information is included, a cell information, and a cell ID value.

4. Devices for Implementation

Figure 13:
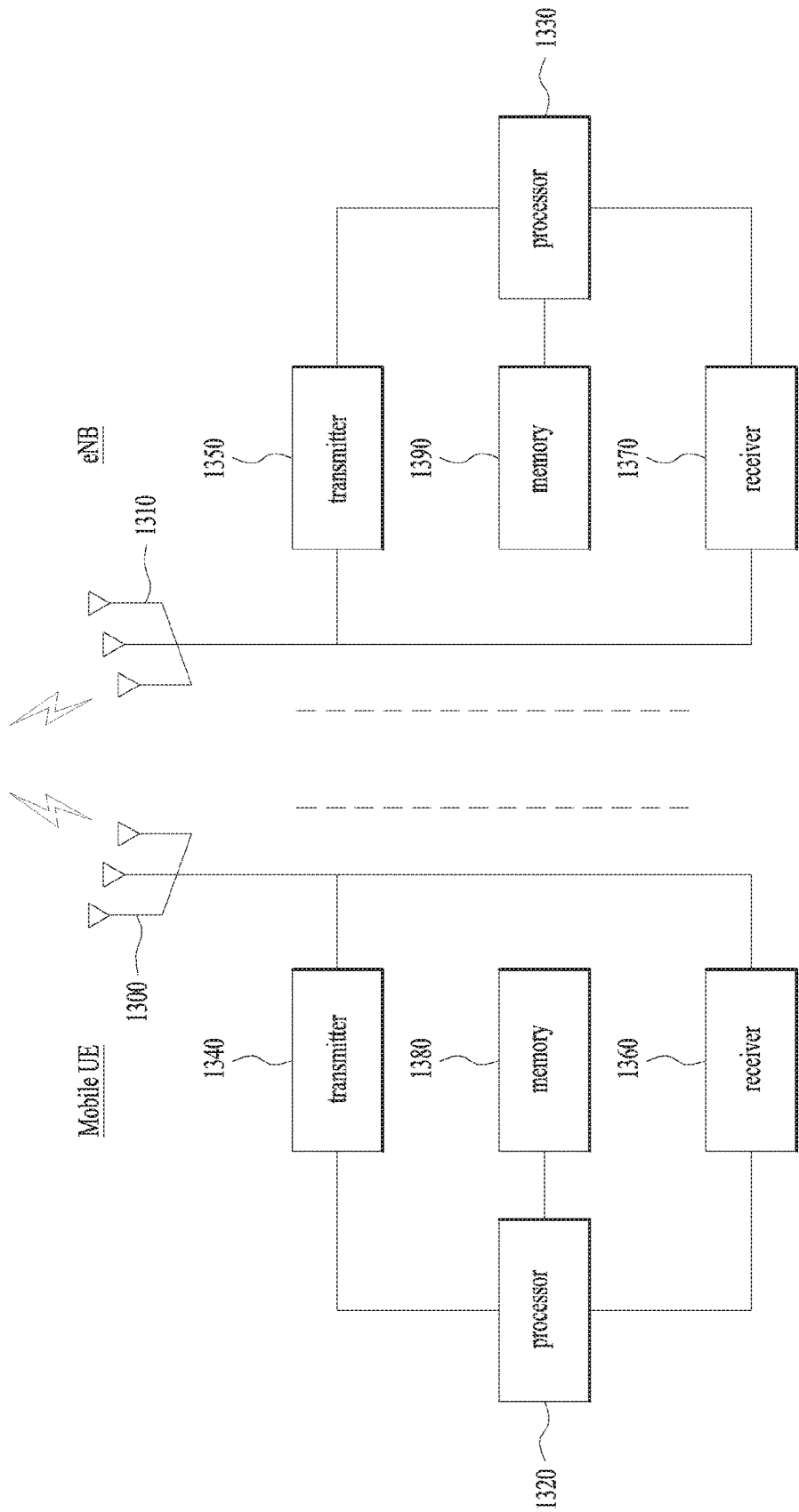
FIG. 13 illustrates devices for implementing the embodiments described with reference to FIGS. 1 to 12.

FIG. 13 illustrates devices for implementing the embodiments described with reference to FIGS. 1 to 12.

A user equipment (UE) may operate as a transmitting end in uplink and operate as a receiving end in downlink. And, an eNB (e-Node B) may operate as a receiving end in uplink and operate as a transmitting end in downlink.

In particular, the UE and the eNB may include transmission (Tx) modules 1340 and 1350 and reception (Rx) modules 1350 and 1370 for controlling transmission and reception of information, data and/or messages and include antennas 1300 and 1310 for transmitting/receiving information, data and/or messages, respectively.

Moreover, the UE and the eNB may include processors 1320 and 1330 for performing the above-described embodiments of the present invention and memories 1380 and 1390 for temporarily or continuously storing the processing procedure of the processors, respectively.

The embodiments of the present invention may be implemented using the above-mentioned components and functions of the UE and the eNB. For instance, the processor of the eNB may configure a DL synchronization signal including a cell information by combining the methods disclosed in 1 to 3 and then broadcast it through a transmitter. Moreover, the processor of the UE may detect and receive the DL synchronization signal broadcasted from the eNB through a receiver and then detect the corresponding cell information. Subsequently, the processor of the UE may determine whether to perform an access procedure with respect to a corresponding cell based on the cell information and then perform additional operations according to the cell information. Details of the operations can be referred to the disclosures in 3.

The Tx modules and the Rx modules included in the UE and the eNB may perform a packet modulation/demodulation function for data transmission, a high-speed packet channel coding function, an orthogonal frequency division multiple access (OFDMA) packet scheduling function, a time division duplex (TDD) packet scheduling function and/or a channel multiplexing function. Moreover, the UE and the eNB in FIG. 13 may further include radio frequency/intermediate frequency (RF/IF) modules. In this case, the Tx module and Rx module can be called a transmitter and a receiver, respectively. If used together, the Tx module and the Rx module can be called a transceiver.

Meanwhile, in the present invention, a personal digital assistant (PDA), a cellular phone, a personal communication service (PCS) phone, a global system for mobile (GSM) phone, a wideband CDMA (WCDMA) phone, a mobile broadband system (MBS) phone, a hand-held PC, a laptop, a smart phone or a multi mode-multi band (MM-MB) terminal may be used as the UE.

The smart phone is a terminal including merits of a mobile communication terminal and a PDA and is obtained by adding a data communication function, which is the function of the PDA, such as scheduling, fax transmission/reception and Internet access to the mobile communication terminal. The MM-MB terminal refers to a terminal which includes a multi modem chip and can operate both in a portable Internet system and another mobile communication system (e.g., a code division multiple access (CDMA) 2000 system, a wideband CDMA (WCDMA) system, etc.).

The embodiments of the present invention may be implemented using various means. For instance, the embodiments of the present invention may be implemented using hardware, firmware, software and/or any combinations thereof.

In case of the implementation by hardware, a method according to each embodiment of the present invention may be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code may be stored in the memory unit 1380 and 1390 and be then executed by the processor 1320 and 1330. The memory unit may be provided within or outside the processor to exchange data with the processor through the various means known to the public.

It will be apparent to those skilled in the art that the present invention may be embodied in other specific forms without departing from the spirit and essential characteristics of the invention. Thus, the above embodiments should be considered in all respects as exemplary and not restrictive. The scope of the present invention should be determined by reasonable interpretation of the appended claims and the present invention covers the modifications and variations of this invention that come within the scope of the appended claims and their equivalents. Moreover, it will be apparent that some claims referring to specific claims may be combined with another claims referring to the other claims other than the specific claims to constitute the embodiment or add new claims by means of amendment after the application is filed.

INDUSTRIAL APPLICABILITY

The embodiments of the present invention are applicable to various wireless access systems. Examples of the various wireless access systems include 3$^{re}$ Generation Partnership Project (3GPP), 3GPP2 and/or Institute of Electrical and Electronic Engineers 802 (IEEE 802.xx) systems. The embodiments of the present invention are applicable to all technical fields using the various wireless access systems in addition to the various wireless access systems.

What is claimed is:

1. A method of communicating by an eNodeB (eNB) in a wireless access system, the method comprising:
configuring, by the eNB, a primary synchronization signal (PSS) and a secondary synchronization signal (SSS),
wherein the PSS or the SSS includes cell information of a specific cell, the configuring comprising dynamically selecting the cell information from a plurality of possible cell information; and
broadcasting, by the eNB, the PSS and the SSS that includes the dynamically selected cell information,
wherein a user equipment (UE), which receives the PSS and the SSS, determines whether to perform an initial access procedure with the specific cell based on the cell information of the specific cell before the UE acquires a master information block (MIB) and a system information block (SIB) from the eNB,
wherein the dynamically selected cell information of the specific cell comprise x bits, y bits and z bits, the x bits being a cell information indicator indicating which type of cell related information is included in the y bits, the type of cell related information being one of a plurality of types of cell information, the z bits indicating a cell identifier, and
wherein an arrangement order of the x bits, y bits and z bits is dynamically changed based on the broadcasted dynamically selected cell information of the specific cell.

2. A method of receiving a cell information by a user equipment (UE) in a wireless access system, the method comprising:
receiving, from an eNodeB (eNB), a primary synchronization signal (PSS) and a secondary synchronization signal (SSS),
wherein the PSS or the SSS includes cell information of a specific cell, the cell information having been dynamically selected by the eNB; and
before acquiring a master information block (MIB) and a system information block (SIB) from the eNB, determining whether to perform an initial access procedure with the specific cell based on the dynamically selected cell information of the specific cell,
wherein the dynamically selected cell information of the specific cell comprise x bits, y bits and z bits, the x bits being a cell information indicator indicating which type of cell related information is included in the y bits, the type of cell related information being one of a plurality of types of cell information, the z bits indicating a cell identifier, and
wherein an arrangement order of the x bits, y bits and z bits is dynamically changed based on the broadcasted dynamically selected cell information of the specific cell.

3. The method of claim 2, wherein the dynamically selected cell information of the specific cell comprises at least one of an ETWS (Earthquake and Tsunami Warning System) indicator, a CMAS (Commercial Mobile Alert System) indicator, a cell load information, a transmission power information of the specific cell, a C-RAN (Cloud Radio Access Network) indicator, a BBU ID (Base Band Unit Identifier) information, or a layer level information of the specific cell.

4. The method of claim 3, wherein if the cell load information indicates that cell load of the specific cell is 'high', the UE determines not to perform the initial access procedure with the specific cell.

5. The method of claim 3, wherein the cell load information includes downlink (DL) cell load information and uplink (UL) cell load information.

6. The method of claim 5, wherein whether to perform the initial access procedure with the specific cell is determined for a DL service of the specific cell and an UL service of the specific cell, respectively.

7. The method of claim 2,
wherein the cell information indicates whether the specific cell is a Closed Subscriber Group (CSG) cell, and
wherein if the specific cell is the CSG cell, and if the UE does not have a CSG capability or a CSG identifier (ID) is not configured for the UE, the UE determines not to perform the initial access procedure with the specific cell.

8. The method of claim 7,
wherein the dynamically selected cell information of the specific cell further comprises a group ID indicating a specific group which includes the CSG cell, and
wherein if a CSG ID configured for the UE is not included in the specific group, the UE determines not to perform the initial access procedure with the specific cell.

9. A user equipment (UE) configured to receive a cell information in a wireless access system, comprising:
a Radio Frequency (RF) module; and
a processor operably coupled with the RF module and configured to:
control the RF module to receive, from an eNodeB (eNB), a primary synchronization signal (PSS) and a secondary synchronization signal (SSS),
wherein the PSS or the SSS includes cell information of a specific cell, the cell information having been dynamically selected by the eNB; and
before acquiring a master information block (MIB) and a system information block (SIB) from the eNB, determine whether to perform an initial access procedure with the specific cell based on the dynamically selected cell information of the specific cell,
wherein the dynamically selected cell information of the specific cell comprise x bits, y bits and z bits, the x bits being a cell information indicator indicating which type of cell related information is included in the y bits, the type of cell related information being one of a plurality of types of cell information, the z bits indicating a cell identifier, and
wherein an arrangement order of the x bits, y bits and z bits is dynamically changed based on the broadcasted dynamically selected cell information of the specific cell.

10. The UE of claim 9, wherein the dynamically selected cell information of the specific cell comprises at least one of an ETWS (Earthquake and Tsunami Warning System) indicator, a CMAS (Commercial Mobile Alert System) indicator, a cell load information, a transmission power information of the specific cell, a C-RAN (Cloud Radio Access Network) indicator, a BBU ID (Base Band Unit Identifier) information, or a layer level information of the specific cell.

11. The UE of claim 10, wherein if the cell load information indicates that cell load of the specific cell is 'high', the UE determines not to perform the initial access procedure with the specific cell.

12. The UE of claim 10, wherein the cell load information includes downlink (DL) cell load information and uplink (UL) cell load information.

13. The UE of claim 12, wherein whether to perform the initial access procedure with the specific cell is determined for a DL service of the specific cell and an UL service of the specific cell, respectively.

14. The UE of claim 9,
wherein the cell information indicates whether the specific cell is a Closed Subscriber Group (CSG) cell, and
wherein if the specific cell is the CSG cell, and if the UE does not have a CSG capability or a CSG identifier (ID) is not configured for the UE, the UE determines not to perform the initial access procedure with the specific cell.

15. The UE of claim 14,
wherein the dynamically selected cell information of the specific cell further comprises a group ID indicating a specific group which includes the CSG cell, and
wherein if a CSG ID configured for the UE is not included in the specific group, the UE determines not to perform the initial access procedure with the specific cell.

* * * * *